US011577209B2

(12) United States Patent
Kim et al.

(10) Patent No.: US 11,577,209 B2
(45) Date of Patent: Feb. 14, 2023

(54) REACTOR FOR NANOPARTICLE PRODUCTION

(71) Applicant: LG CHEM, LTD., Seoul (KR)

(72) Inventors: Eun Jeong Kim, Daejeon (KR); Jun Won Choi, Daejeon (KR); Jin Mi Jung, Daejeon (KR); Ye Hoon Im, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 133 days.

(21) Appl. No.: 16/638,647

(22) PCT Filed: Sep. 5, 2018

(86) PCT No.: PCT/KR2018/010361
§ 371 (c)(1),
(2) Date: Feb. 12, 2020

(87) PCT Pub. No.: WO2019/050270
PCT Pub. Date: Mar. 14, 2019

(65) Prior Publication Data
US 2021/0129100 A1 May 6, 2021

(30) Foreign Application Priority Data

Sep. 7, 2017 (KR) .................. 10-2017-0114288

(51) Int. Cl.
*B01J 6/00* (2006.01)
*B01J 4/00* (2006.01)
(Continued)

(52) U.S. Cl.
CPC .............. *B01J 6/008* (2013.01); *B01J 4/002* (2013.01); *B01J 19/06* (2013.01); *B01J 19/121* (2013.01);
(Continued)

(58) Field of Classification Search
CPC ... B01J 6/008; B01J 4/002; B01J 19/06; B01J 19/121; B01J 19/26; B01J 2219/0869;
(Continued)

(56) References Cited

U.S. PATENT DOCUMENTS

2005/0042152 A1 2/2005 Gardner et al.
2008/0013589 A1 1/2008 Melchior et al.
(Continued)

FOREIGN PATENT DOCUMENTS

CN 1123209 A 5/1996
CN 1374883 A 10/2002
(Continued)

OTHER PUBLICATIONS

Office Action of Japanese Patent Office in Appl'n No. 2020-506338, dated Mar. 9, 2021.
(Continued)

*Primary Examiner* — Xiuyu Tai
(74) *Attorney, Agent, or Firm* — Dentons US LLP

(57) ABSTRACT

A reactor for nanoparticle production comprising a main chamber including a first nozzle to which raw material gas is supplied, a lens housing connected to the main chamber in a fluidly movable manner and including a second nozzle for supplying flushing gas to the lens housing, a lens mounted on the lens housing, a light source for irradiating a laser, which passes through the lens to reach the raw material gas in the main chamber, and a hood for discharging nanoparticles generated in the main chamber. A cross-sectional area of at least a part of the lens housing decreases along a direction facing the main chamber.

8 Claims, 7 Drawing Sheets

(51) Int. Cl.
- *B01J 19/06* (2006.01)
- *B01J 19/12* (2006.01)
- *B01J 19/26* (2006.01)
- *C01B 33/029* (2006.01)
- *B82Y 40/00* (2011.01)

(52) U.S. Cl.
CPC ............ *B01J 19/26* (2013.01); *C01B 33/029* (2013.01); *B01J 2219/0869* (2013.01); *B01J 2219/0875* (2013.01); *B01J 2219/12* (2013.01); *B82Y 40/00* (2013.01); *C01P 2004/64* (2013.01)

(58) Field of Classification Search
CPC ............ B01J 2219/0875; B01J 2219/12; B01J 8/006; B01J 2219/0879; C01B 33/029; C01B 32/18; B82Y 40/00; B82Y 10/00; B82Y 30/00; C01P 2004/64; G03F 1/82; G03F 1/72; G03F 7/0002; C23C 16/047; G01Q 80/00; Y10T 156/1158; B01D 46/48; B01D 50/002; B01D 45/02; B01D 46/02; B01D 46/24; B01D 46/54; B01D 46/10; B82B 3/00
See application file for complete search history.

(56) References Cited

U.S. PATENT DOCUMENTS

| | | | | |
|---|---|---|---|---|
| 2009/0301861 A1* | 12/2009 | Azami | .................. | B82Y 30/00 |
| | | | | 204/157.41 |
| 2010/0320171 A1* | 12/2010 | Mao | ...................... | B82Y 10/00 |
| | | | | 216/65 |
| 2015/0190886 A1* | 7/2015 | Huonker | .............. | B23K 26/706 |
| | | | | 219/121.84 |
| 2017/0189888 A1 | 7/2017 | Cho | | |

FOREIGN PATENT DOCUMENTS

| | | |
|---|---|---|
| CN | 1589236 A | 3/2005 |
| CN | 102430762 A | 5/2012 |
| CN | 104966981 A | 10/2015 |
| EP | 0695600 B1 | 2/2000 |
| JP | 60-121097 A | 6/1985 |
| JP | 1-242143 A | 9/1989 |
| JP | 2000-176670 A | 6/2000 |
| JP | 2003-505233 A | 2/2003 |
| KR | 10-0373947 B1 | 5/2003 |
| KR | 10-20140072107 A | 6/2014 |
| KR | 10-1505637 B1 | 3/2015 |
| WO | 99/23189 A1 | 5/1999 |
| WO | 01/07155 A1 | 2/2001 |
| WO | 2008/118865 A2 | 10/2008 |
| WO | 2013/052262 A1 | 4/2013 |

OTHER PUBLICATIONS

Van Erven et al. "The Improvement and Upscaling of a Laser Chemical Vapor Pyrolysis Reactor", KONA Powder and Particle Journal, 2009, vol. 27, pp. 157-173.

Chizhik et al., "Confocal microscopy and spectroscopy of defect photoluminescence in single SiO2 nanoparticles", Nanophotonic Materials VI, Proceedings of SPIE—The International Society for Optical Engineering, vol. 7393, pp. 739305-1-739305-11 (2009).

* cited by examiner

[Figure 1 - RELATED ART]
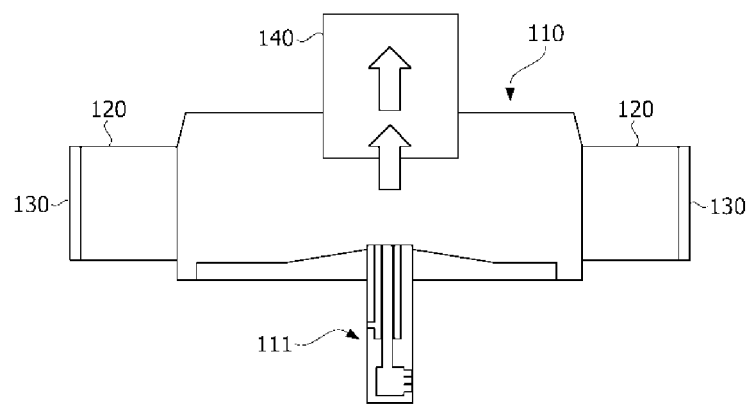
[Figure 2 - RELATED ART]
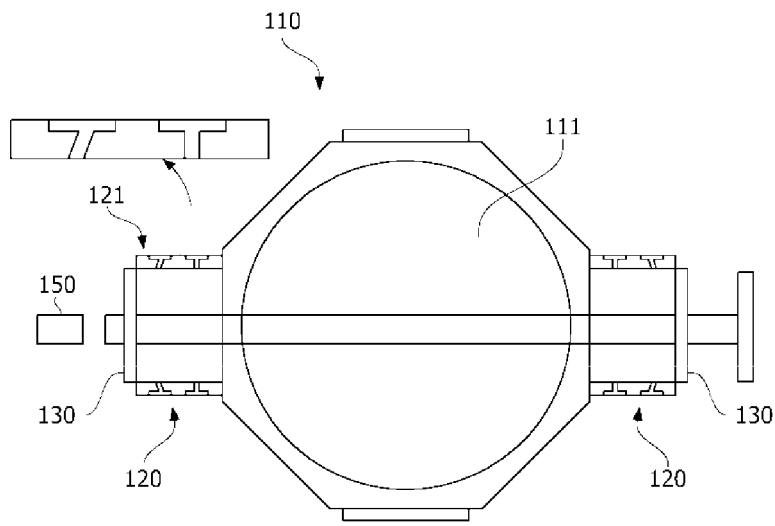

[Figure 3 - RELATED ART]
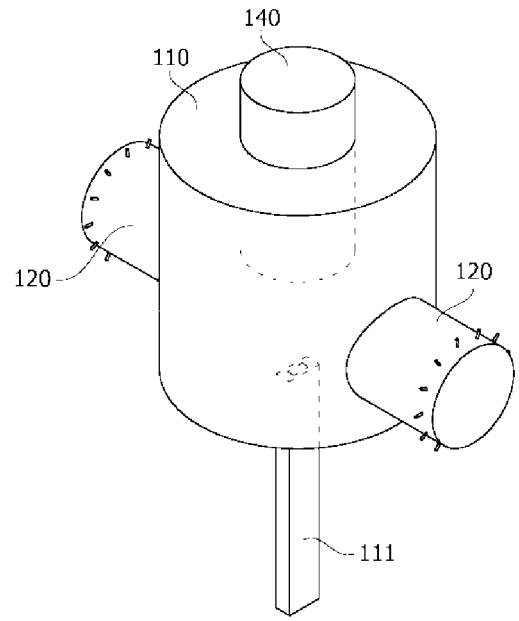
[Figure 4 - RELATED ART]
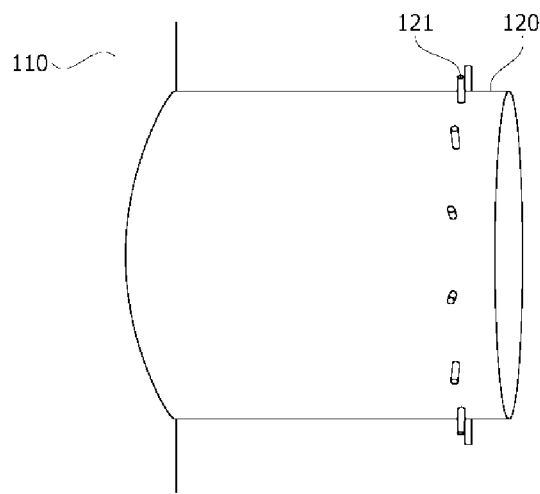

[Figure 5 - RELATED ART]
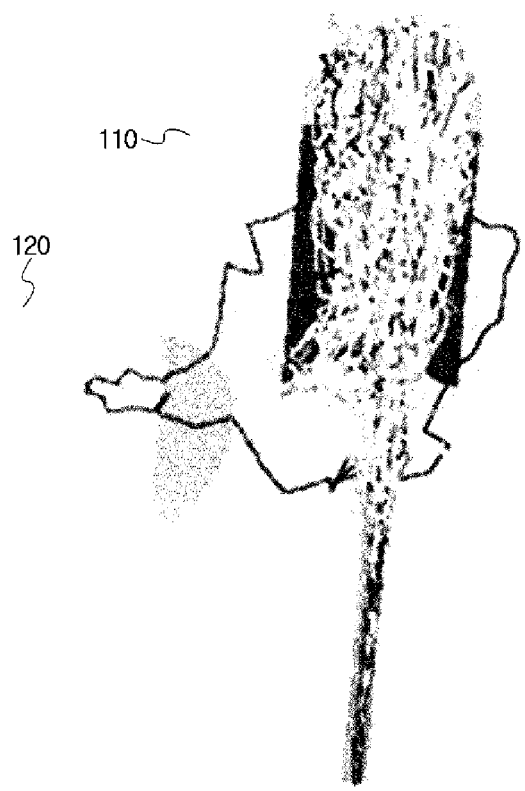

[Figure 6]
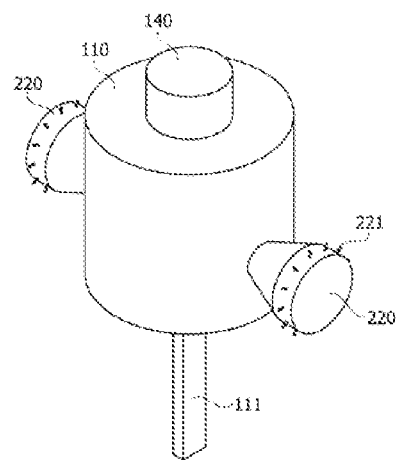
[Figure7]
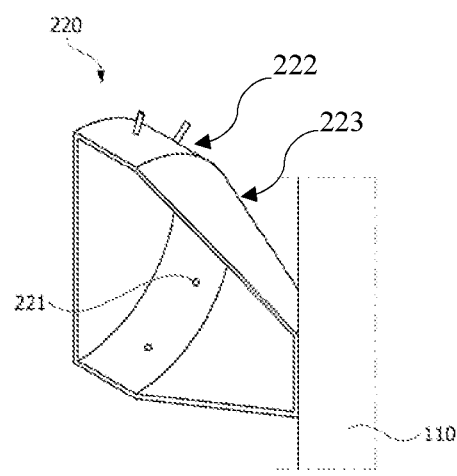

[Figure 8]
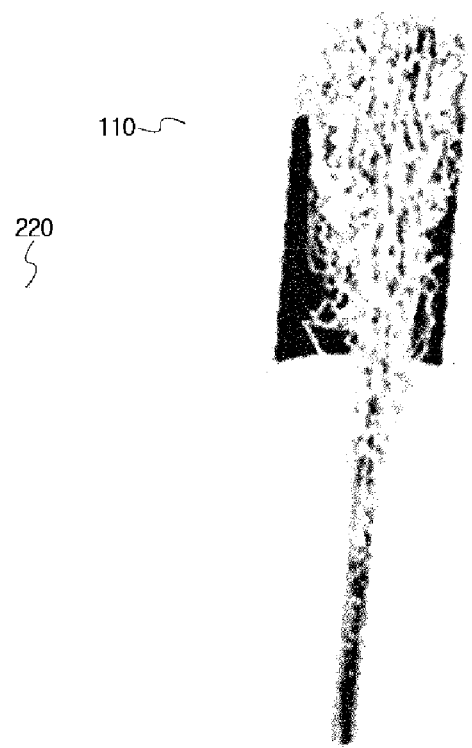

[Figure 9]
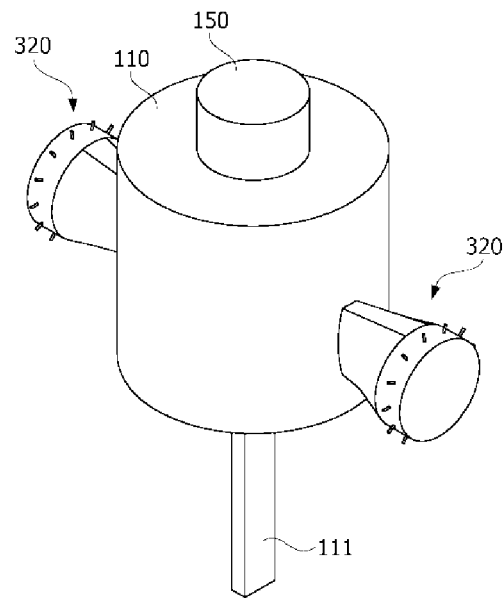
[Figure 10]
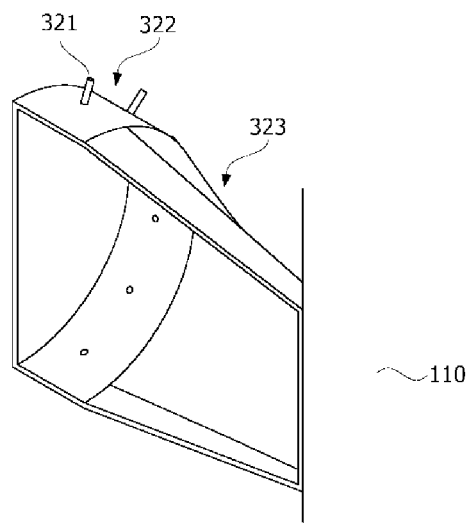

[Figure 11]
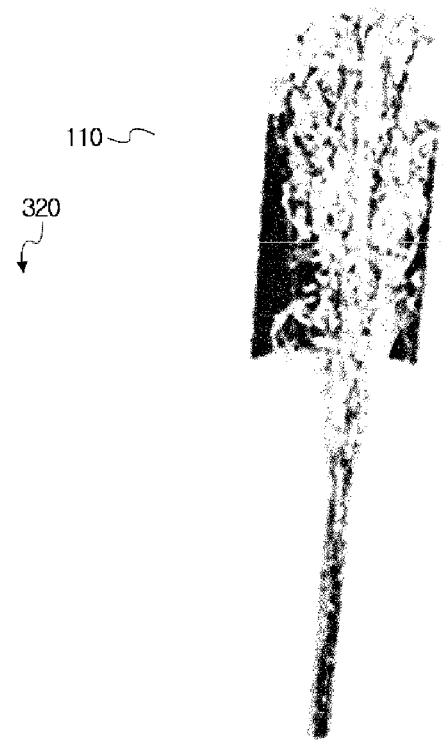
[Figure 12]
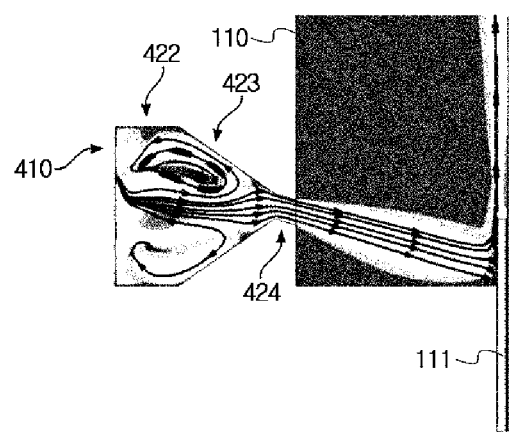

REACTOR FOR NANOPARTICLE PRODUCTION

This application is the U.S. national stage of international Application No. PCT/KR2018/010361, filed Sep. 5, 2018, and claims the benefit of priority based on Korean Patent Application No. 10-2017-0114288 filed on Sep. 7, 2017, the disclosures of which are incorporated herein by reference in their entirety.

TECHNICAL FIELD

The present invention relates to a reactor for nanoparticle production.

BACKGROUND

In general, a laser pyrolysis method is a method of forming nanoparticles by irradiating a raw material with a laser to decompose the raw material.

Silicon nanoparticles can be synthesized by pyrolyzing silane gas ($SiH_4$) using a laser. In such an apparatus, it is important to collect the synthesized nanoparticles well without loss in order to improve productivity.

A laser pyrolysis reaction apparatus is equipped with an optical lens through which a laser beam passes, where if the lens is contaminated by nanoparticles, there is a possibility that the lens is broken.

In order to prevent this, the lens is installed apart from the main chamber through which the raw material gas flows, and a flushing gas injection nozzle for preventing the inflow of nanoparticles is provided in the region where the lens is installed. However, the conventional reactor did not completely prevent the nanoparticles from flowing to the lens side, so that the lens was contaminated by the nanoparticles, and thus the continuous operation was impossible.

SUMMARY

It is a problem to be solved by the present invention to provide a reactor for nanoparticle production capable of preventing nanoparticles from flowing to the lens side.

To solve the above-described problem, according to one aspect of the present invention, there is provided a reactor for nanoparticle production, comprising a main chamber including a first nozzle to which raw material gas is supplied, a lens housing connected to the main chamber in a fluidly movable manner and including a second nozzle for supplying flushing gas therein, a lens mounted on the lens housing, a light source for irradiation of a laser for passing through the lens to reach the raw material gas in the main chamber, and a hood for discharging nanoparticles generated in the main chamber, wherein the lens housing is provided so that a cross-sectional area of at least a part of a region decreases along the direction facing the main chamber.

As described above, the reactor for nanoparticle production related to at least one example of the present invention has the following effects.

The lens housing equipped with the lens is formed to have the reduced cross-sectional area toward the main chamber direction, thereby increasing momentum of the flushing gas in the lens housing, and as a result, the inflow of the nanoparticles from the main chamber into the lens of the lens housing can be prevented.

Furthermore, by bending the flow path of the lens housing so that the flushing gas stream does not directly contact the raw material gas stream in the main chamber, it can be prevented that the flushing gas accelerated in the lens housing disturbs the raw material gas stream in the main chamber, whereby the nanoparticles contaminate the inner wall surfaces of the main chamber.

BRIEF DESCRIPTION OF DRAWINGS

FIGS. 1 and 2 are schematic diagrams showing a conventional reactor for nanoparticle production.

FIGS. 3 and 4 are essential part perspective diagrams showing the reactor for nanoparticle production of FIG. 1.

FIG. 5 is a simulation result showing trajectories of particles in the reactor of FIG. 3.

FIGS. 6 and 7 are essential part perspective diagrams showing a reactor for nanoparticle production according to a first exemplary embodiment of the present invention.

FIG. 8 is a simulation result showing trajectories of particles in the reactor of FIG. 6.

FIGS. 9 and 10 are essential part perspective diagrams showing a reactor for nanoparticle production according to a second exemplary embodiment of the present invention.

FIG. 11 is a simulation result showing trajectories of particles in the reactor of FIG. 9.

FIG. 12 is a simulation result showing trajectories of particles in the reactor according to a third exemplary embodiment of the present invention.

DETAILED DESCRIPTION

Hereinafter, a reactor for nanoparticle production according to one example of the present invention will be described in detail with reference to the accompanying drawings.

In addition, the same or similar reference numerals are given to the same or corresponding components regardless of reference numerals, of which redundant explanations will be omitted, and for convenience of explanation, the size and shape of each constituent member as shown may be exaggerated or reduced.

In this document, the reactor for nanoparticle production is associated with a laser pyrolysis reaction apparatus.

FIGS. 1 and 2 are schematic diagrams showing a conventional reactor (100) for nanoparticle production, FIGS. 3 and 4 are essential part perspective diagrams showing the reactor (100) for nanoparticle production shown in FIG. 1, and FIG. 5 is a simulation result showing trajectories of particles in the reactor of FIG. 3.

The reactor (100) comprises a main chamber (110) including a first nozzle (111) to which raw material gas is supplied and a lens housing (120) connected to the main chamber (110) in a fluidly movable manner and including a second nozzle (121) for supplying flushing gas therein. In addition, the reactor (100) comprises a lens (130) mounted on the lens housing (120), a light source (150) for irradiation of a laser for passing through the lens (130) to reach the raw material gas in the main chamber (110), and a hood (140) for discharging nanoparticles generated in the main chamber (110).

In one example, the light source (150) may be provided so that a carbon dioxide (CO2) laser is irradiated, and the raw material gas may comprise monosilane (SiH4). Also, the raw material gas and sheath gas (for example, $N_2$) may be injected together through the first nozzle (110). At this time, the first nozzle (110) may be provided so that the raw material gas is injected at the center and the sheath gas is injected in a state of surrounding the raw material gas.

The raw material gas (SiH4) injected into the main chamber (110) from the first nozzle (110) absorbs the laser to be decomposed into the form of radicals (Si radicals) by intense molecular vibrations, and the radicals are developed into nanoparticle nuclei and then coupled with the surrounding radicals to produce spherical nanoparticles (silicon nanoparticles) while gradually growing. The nanoparticles are formed in the reaction region of the main chamber (110) where the raw material gas and the laser cross each other, and the residual gas after the reaction reaches the hood (140) with the synthesized particles. In order to prevent the lens (130) from being contaminated and damaged by the nanoparticles, the lens (130) is installed to be spaced apart from the main chamber (110) via the lens housing (120) and the lens housing (120) is equipped with a second nozzle (121) for injecting the flushing gas.

As in FIGS. 3 and 4, when the cross-sectional area (flow cross-sectional area) of the lens housing (120) was constant along the direction facing the main chamber, it was shown that referring to FIG. 5, some of the particles included in the raw material gas contacted the lens (130). Particularly, as a result of analyzing velocity vectors, it was confirmed that a flow flowed from the main chamber (110) to the lens (130) of the lens housing (120). It is confirmed that nanoparticles flow into the lens housing (120) along this flow.

FIGS. 6 and 7 are essential part perspective diagrams showing a reactor for nanoparticle production according to a first exemplary embodiment of the present invention, and FIG. 8 is a simulation result showing trajectories of particles in the reactor of FIG. 6.

The lens housing (220) is provided so that a cross-sectional area (flow cross-sectional area) of at least a part of a region decreases along the direction facing the main chamber (110).

The cross-sectional area of the lens housing (220) can be variously determined, and for example, the cross-section of the lens housing (220) can be circular.

In one example, the lens housing (220) may comprise a first region (222) that the cross-sectional area remains constant along the direction facing the main chamber (110), and a second region (223) extending from the first region (222) to the main chamber (110) side and having a reduced cross-sectional area.

At this time, the lens (130) may be disposed on the first region side, and the second nozzle (321) may be disposed on the first region side.

Furthermore, the first region and the second region may be provided so that the central axes are coaxially positioned. For example, the lens housing (220) may be disposed so that the central axis of the first region (222) is orthogonal to the central axis of the first nozzle (111).

At this time, the light source (140) may be disposed such that the laser passes through the first region and the second region to be irradiated into the main chamber (110).

As the diameter of the lens housing (220) decreases toward the main chamber (110), the flow rate of the flushing gas (for example, $N_2$) increases in the connecting region between the lens housing (220) and the main chamber (110), and as the momentum of the flushing gas increases, a backflow phenomenon of nanoparticles into the main chamber (110) disappears. Referring to FIG. 8, it can be seen that the trajectory of the particle facing the lens side is not found.

FIGS. 9 and 10 are essential part perspective diagrams showing a reactor for nanoparticle production according to a second exemplary embodiment of the present invention, and FIG. 11 is a simulation result showing trajectories of particles in the reactor of FIG. 9.

The lens housing (320) is provided so that a cross-sectional area (flow cross-sectional area) of at least a part of a region decreases along the direction facing the main chamber (110).

The cross-sectional area of the lens housing (320) can be variously determined, and for example, the cross-section of the lens housing (320) may be configured by including a straight portion and a curved portion, as in FIG. 9.

In one example, the lens housing (320) may comprise a first region (322) that the cross-sectional area remains constant along the direction facing the main chamber (110), and a second region (323) extending from the first region (322) to the main chamber (110) side and having a reduced cross-sectional area.

At this time, the lens (130) may be disposed on the first region (322) side, and the second nozzle (321) may be disposed on the first region (322) side.

Furthermore, the first region (322) and the second region (323) may be provided so that the central axes are coaxially positioned. For example, the lens housing (320) may be disposed so that the central axis of the first region (322) is orthogonal to the central axis of the first nozzle (111).

At this time, the light source (150) may be disposed such that the laser passes through the first region (322) and the second region (323) to be irradiated into the main chamber (110).

As the diameter of the lens housing (120) decreases toward the main chamber (110), the flow rate of the flushing gas increases in the connecting region between the lens housing (320) and the main chamber (110), and as the momentum of the flushing gas increases, a backflow phenomenon of nanoparticles into the main chamber (110) disappears. Referring to FIG. 11, it can be seen that the trajectory of the particle facing the lens side is not found.

FIG. 12 is a simulation result showing trajectories of particles in the reactor according to a third exemplary embodiment of the present invention.

The lens housing (410) is provided so that a cross-sectional area (flow cross-sectional area) of at least a part of a region decreases along the direction facing the main chamber (110).

In one example, the lens housing (410) may comprise a first region (422) that the cross-sectional area remains constant along the direction facing the main chamber (110), and a second region (423) extending from the first region (422) to the main chamber (110) side and having a reduced cross-sectional area. In addition, the lens housing (420) may comprise a third region (424) which extends from the second region (422) and that the central axis is not positioned coaxially with the second region (422).

At this time, the lens (130) may be disposed on the first region (422) side, and the second nozzle (421) may be disposed on the first region (422) side.

Furthermore, the first region (422) and the second region (423) may be provided so that the central axes are coaxially positioned. For example, the lens housing (420) may be disposed so that the central axis of the first region (422) is orthogonal to the central axis of the first nozzle (111). At this time, the third region (424) may be inclined downward to the first nozzle (111) side with respect to the first region (422).

In this structure, it can be prevented that the flushing gas stream in the lens housing (420) and the raw material gas stream injected from the first nozzle (111) intersect vertically.

In this case, since the flushing gas stream collides with the outer wall of the first nozzle and then rises with surrounding the first nozzle, it also acts as shielding gas for preventing diffusion of the raw material gas.

The preferred examples of the present invention as described above are disclosed for exemplary purpose, where those skilled in the art having ordinary knowledge for the present invention can make various corrections, modifications and additions within idea and scope of the present invention, and such a correction, modification and addition should be considered as falling within the scope of the following claims.

According to the reactor for nanoparticle production related to at least one example of the present invention, it can be prevented that the flushing gas accelerated in the lens housing disturbs the raw material gas stream in the main chamber, whereby the nanoparticles contaminate the inner wall surfaces of the main chamber.

The invention claimed is:

1. A reactor for nanoparticle production comprising:
a main chamber including a first nozzle to which raw material gas is supplied;
a lens housing connected to the main chamber, wherein the lens housing includes a plurality of second nozzles for supplying flushing gas to the lens housing;
a lens mounted on the lens housing;
a light source for irradiating a laser on the lens, wherein the laser passes through the lens to reach the raw material gas and generate nanoparticles in the main chamber; and
a hood for discharging the nanoparticles generated in the main chamber,
wherein the lens housing comprises: a first region having a constant cross-sectional area along a direction facing the main chamber; a second region extending from the first region to the main chamber, wherein the cross-sectional area of the second region decreases along a direction from the first region to the main chamber; and a third region which extends from the second region, and wherein the central axis of the third region is not positioned coaxially with the central axis of the second region.

2. The reactor for nanoparticle production according to claim 1,
wherein the lens is disposed in the first region.

3. The reactor for nanoparticle production according to claim 1,
wherein the plurality of second nozzles are disposed in the first region.

4. The reactor for nanoparticle production according to claim 1,
wherein the first region and the second region are provided so that the central axes of the first and second regions are coaxially positioned.

5. The reactor for nanoparticle production according to claim 1,
wherein the lens housing is disposed so that the central axis of the first region is orthogonal to a central axis of the first nozzle, and
the third region is inclined downward toward the first nozzle with respect to the first region.

6. The reactor for nanoparticle production according to claim 5,
wherein the light source is disposed such that the laser passes through the first region to the third region and is then radiated into the main chamber.

7. The reactor for nanoparticle production according to claim 1,
wherein the light source comprises a carbon dioxide ($CO_2$) laser, and the raw material gas comprises monosilane ($SiH_4$).

8. The reactor for nanoparticle production according to claim 1,
wherein the lens housing is disposed so that a central axis of the first region is orthogonal to a central axis of the first nozzle.

* * * * *